United States Patent [19]
Bonvicini

[11] 3,776,459
[45] Dec. 4, 1973

[54] SPRAYER ATTACHMENT FOR LEAF BLOWER

[76] Inventor: Gene F. Bonvicini, Morehouse Rd., Easton, Conn. 06612

[22] Filed: Jan. 8, 1973

[21] Appl. No.: 321,764

[52] U.S. Cl............................ 239/77, 239/379,
[51] Int. Cl............................................. A01n 17/08
[58] Field of Search....................... 239/77, 78, 172, 239/379, 373; 415/219 B; 417/231 15/405; 222/510, 509

[56] References Cited
UNITED STATES PATENTS

| | | | |
|---|---|---|---|
| 2,708,596 | 5/1955 | Weller | 239/77 |
| 2,738,226 | 3/1956 | Bals | 239/77 |
| 232,020 | 9/1880 | Fredericks | 222/510 X |
| 3,339,846 | 9/1967 | Guetet | 239/77 X |

Primary Examiner—M. Henson Wood, Jr.
Assistant Examiner—James J. Love
Attorney—H. Gibner Lehmann et al.

[57] ABSTRACT

A garden spray attachment for use with high-powered leaf blowers and the like, comprising a tank or container for insecticide liquid, having a discharge spout at the bottom which is controlled as to the rate of flow by a manually adjustable valve. The tank has means for attaching it to the structural parts of the leaf blower, preferably the casing of the centrifugal air impeller, in such a manner that the discharge line from the tank can be brought directly to the air intake of the impeller. The attachment additionally includes a discharge conduit which has a nozzle portion that is movable with respect to the remainder, so as to direct fluid passing through it in different directions. The discharge conduit includes an adapter fitting which in most cases has a rectangular portion adapted to be releasably secured to the discharge duct of the leaf blower. The discharge conduit is preferably of cylindrical large-diameter plastic tubing having a helical wire reinforcement. The fitting of the discharge conduit has a circular portion adapted to mate with and be secured to the cylindrical conduit tubing. For directing the moveable nozzle portion of the discharge conduit, a flexible line such as a plastic rope or the like passes through it and is secured to the adapter fitting, said line being manually manipulated as by pulling, and causing bending of the conduit so as to direct the discharge spray to the desired areas.

10 Claims, 10 Drawing Figures

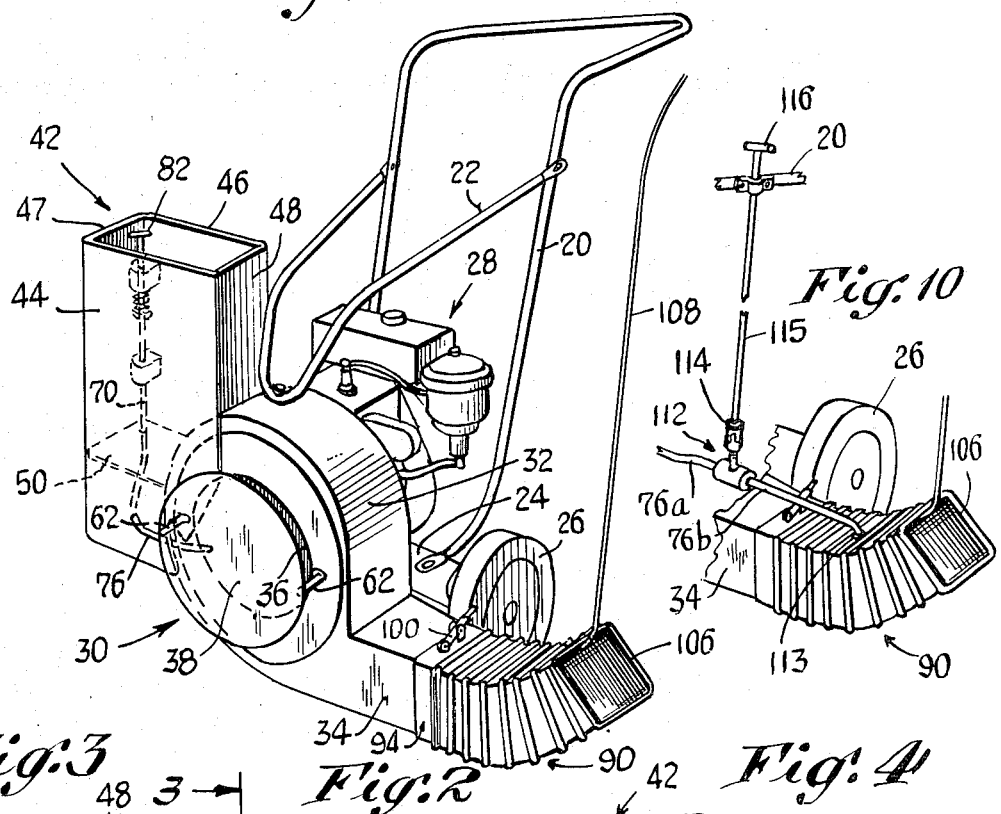
Fig. 1
Fig. 10
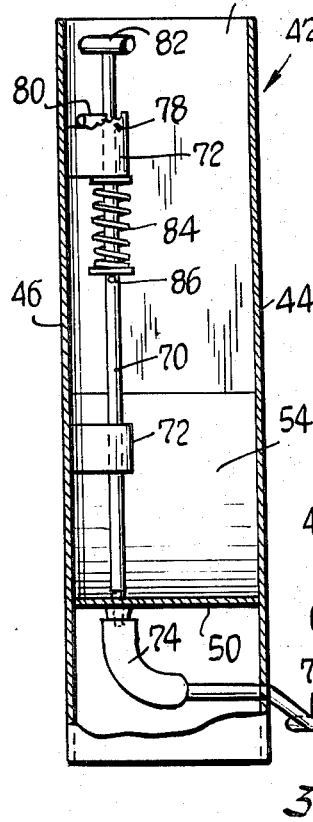
Fig. 3
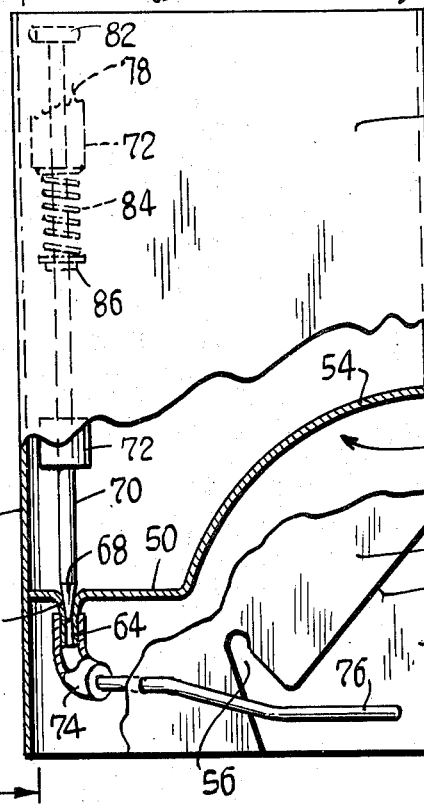
Fig. 2
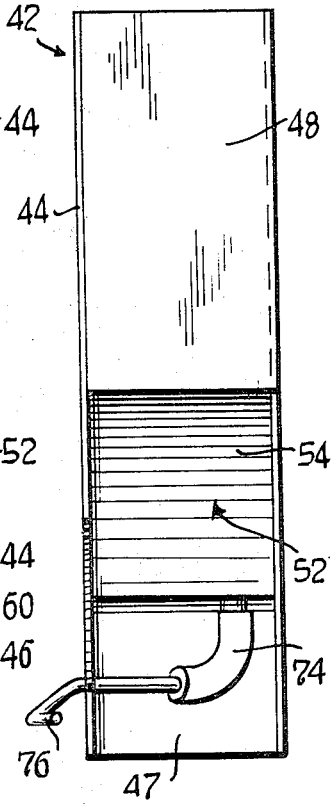
Fig. 4

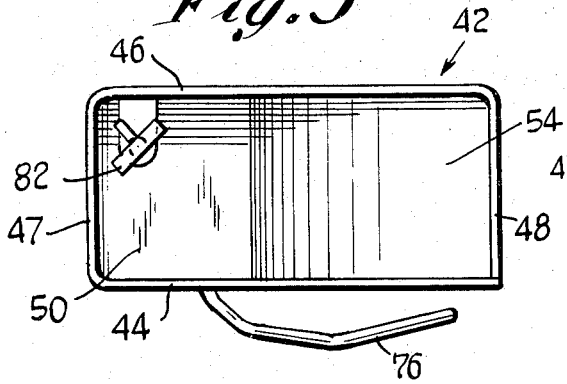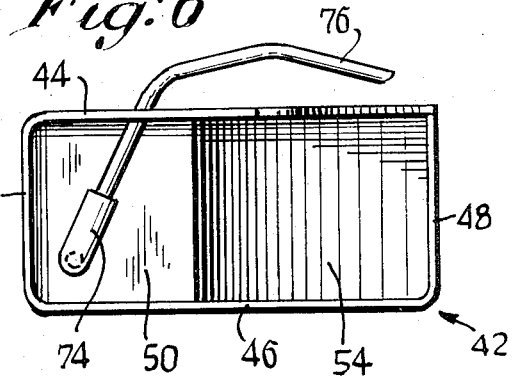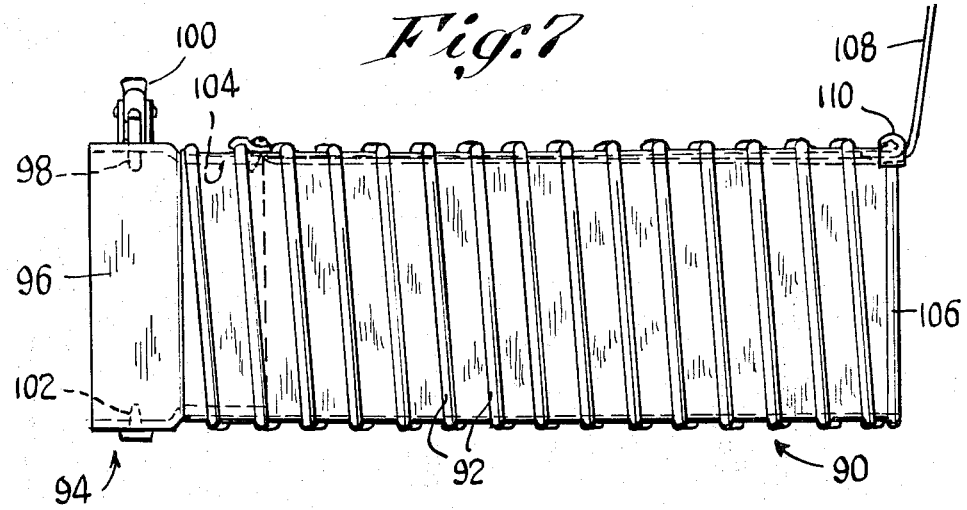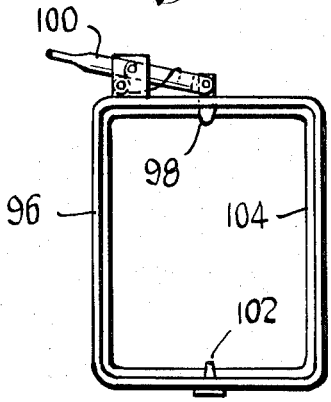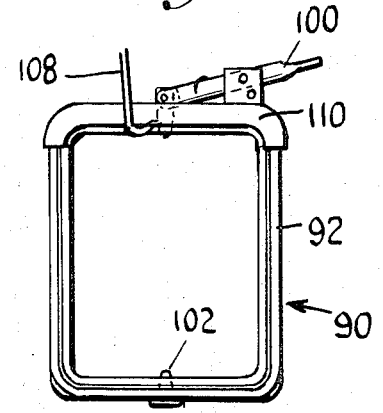

SPRAYER ATTACHMENT FOR LEAF BLOWER

BACKGROUND

This invention relates to garden insecticide spray devices, an more particularly to devices of this type which are intended for power spraying of trees, bushes and other foliage, as distinguished from hand-powered sprayers, garden hose (hydraulic) powered sprayers and the like.

In the past a large number of garden insecticide spray devices have been proposed and produced. Some consisted of a one gallon or two gallon tank or the like which was intended to contain the spraying liquid and was provided with an air pump by which it could be pressurized, thereby to exert impelling force for spraying the liquid from a suitable nozzle carried on a flexible hose. This type of hand-powered sprayer was not only inconvenient to use, but also difficult to clean and limited as to its range. In addition, the matter of spraying any sizeable area with it turned out to be a very time-consuming and tedious job. Other sprayers utilized an electric-power driven pump for providing pressure to a portable container, thereby to replace the hand-powered pressure system of the above-mentioned simple sprayer device. While this eliminated to some extent the manual work involved in supplying the necessary pressure, there still remained the other drawbacks enumerated above. Yet other spraying devices consisted of an attachment for a garden hose whereby water pressure could be utilized to provide the necessary power. Such an attachment usually consisted of a small jar in which concentrated insecticide was placed, together with an aspirator arrangement by which the water issuing from a nozzle sucked up the concentrated insecticide and became mixed therewith to provide a stream having the necessary chemical concentration to carry out the desired purposes. While such attachments eliminated the necessity for electrical pumps with their attendant electrical hazards, it still had the drawback of a very limited range as well as a poor dispersion of the insecticide liquid. The stream issuing from the nozzle covered only a small area and could not be projected upward any appreciable distance. Also, the insecticide was produced in the form of relatively large droplets which did not fully cover all leaf and bark surfaces. Much of the insecticide dropped to the ground and was thus lost, serving no useful purpose. Moreover, such insecticide would contaminate the soil undesirably in the area being sprayed, and this was considered harmful from the standpoint of the ecology as well as being wasteful since a very large percentage did not remain on the foliage but instead was lost in drippings.

SUMMARY

The above disadvantages and drawbacks of prior garden insecticide spraying devices are obviated by the present invention, which has for one object the provision of a novel and improved spray attachment for use with high-powered leaf blowers such as commonly utilize powerful gasoline engines on the order of 5 to 7 horsepower and more, thereby to effect a very fine, aerosol dispersion of the insecticide liquid in the form of a powerful blast which covers a large area and carries for relatively great distances. A related object of the invention is to provide an improved garden insecticide spray attachement as above characterized, which is especially simple in its construction, low in cost, easily and quickly applied to existing leaf blower devices, and which is especially effective in the economical utilization of the insecticide chemicals to produce an especially fine, aerosol-type spray.

A feature of the invention resides in the provision of an improved spray attachment as above set forth, wherein the directing of the spray blast can be easily and quickly effected, and wherein the consumption of the aerosol liquid can be readily controlled, thereby to provide the utmost convenience and ease of operation in utilizing the device to quickly spray large areas.

Still other features and advantages will hereinafter appear.

In the accompanying drawings, illustrating a preferred embodiment of the invention:

FIG. 1 is a front perspective view of a conventional-type leaf blower having secured to it the improved garden insecticide spray attachment as provided by the invention.

FIG. 2 is a front elevational view of the tank or container portion of the spray attachment, with walls broken away to reveal interior details.

FIG. 3 is a vertical section, taken on line 3—3 of FIG. 2.

FIG. 4 is a front elevational view of the tank or container.

FIG. 5 is a bottom plan view of the tank.

FIG. 6 is a top plan view of the tank.

FIG. 7 is a front elevational view of the discharge conduit portion of the attachment.

FIG. 8 is a back end elevational view of the discharge conduit.

FIG. 9 is a front end elevational view of the discharge conduit.

FIG. 10 is a fragmentary perspective view, similar to a portion of FIG. 1 but showing a modification of the invention.

Referring first to FIG. 1, there is illustrated a conventional type leaf blower comprising a handle and frame work assemblage 20, 22 secured to a carriage 24 having wheels 26 by which the blower can be easily moved from place to place. Mounted on the carriage 24 is a gasoline engine 28 which is connected to a centrifugal air impeller designated generally by the numeral 30, said impeller including a cylindrical casing 32 having a tangential discharge duct 34 and a side air intake opening 36. Guarding the opening 36 is a baffle disk 38 which is spaced from the opening and disposed in front of it, thereby constituting a protection for preventing contact with the moving impeller and also tending to screen out large objects and to admit mostly air to the opening 36. The centrifugal impeller (not shown) is of the conventional type, being disposed in the housing 32 and being connected to the engine 28 to be powered thereby. It will be understood that, by virtue of the relatively great power of the engine 28 (5 to 7 hp. and more) and the large size of the air impeller 30 there is generated a very high vacuum at the air intake opening 36 and also a blast of air from the discharge duct 34 which carries for a considerable distance and covers a relatively large area. Such air blast conventionally has been found most effective in clearing leaves from lawns, driveways and the like, and in effect the leaf blower constitutes a kind of electrical sweeper device which quickly clears such areas of leaves and other loose debris by virtue of the high powered air blast and large volume of air that is moved.

In accordance with the present invention there is provided, for use in conjunction with powerful leaf blowers such as that described above, a novel and improved garden insecticide spray attachment comprising a tank or container 42 which is of generally rectangular configuration, said container having front and rear side walls 44, 46 respectively, narrow side walls 47 and 48, a raised bottom wall 50 which is characterized by a recess 52 in one lower corner, as effected by a curved wall portion 54 which joins the bottom wall 50. The recess 52 is so arranged as to accommodate a part of the impeller casing 32, and the front and rear walls 44, 46 of the tank are adapted to fit against the front and rear walls of the casing 32 whereby the tank can be readily mounted thereon. For such purposes the front wall 44 has a deep, upwardly extending notch 56 and a sloped edge 60 by which it can be accommodated on one of the struts 62 of the air impeller housing. Any suitable additional attachment means can be provided, to effect a rigid and sturdy securement of the tank 42 to the impeller housing.

In the bottom wall 50 of the tank there is a discharge opening defined by a depending nipple 64, the opening being surrounded by a circular valve seat 66 which is cooperable with a plug-type valve 68 carried on a vertical valve stem 70 that is supported in slide bearings 72 secured inside the tank. Fitted over the nipple 64 is one end of an elbow which may be conveniently constituted of rubber hose 74 and which has its other end attached to a discharge line 76 preferably constituted of copper tubing, said line passing out through the lower portion of the front wall 44 of the tank with its free end exposed at the intake opening 36 of the air impeller. The upper bearing or collar 72 for the valve stem 70 has a notched top edge 78, and the valve stem has a laterally extending shoulder or pin 80 adapted to ride on said edge whereby turning of the valve stem by means of a handle 82 at its top will result in the stem being supported at different heights. This will dispose the plug valve 68 at different distances from the valve seat 66, thereby enabling a control of the rate of flow of the insecticide from the tank 42 to be had.

A helical coil spring 84 carried by the valve stem 70 engages the upper slide bearing 72 and also engages a cross pin 86 on the stem, thereby to bias the latter downward so as to tend to close the valve comprising the plug 68 and seat 66. With such arrangement a simple adjustment of the rate of flow is had by merely turning the handle 82, and also a complete shut-off of the flow can be effected when the pin 80 reaches the lowest portion of the notched edge 78 of the slide bearing 72.

Referring now to FIGS. 7–9, the flexible discharge conduit part of the attachment comprises a rectangular tube 90 which can be constituted of flexible or resilient plastic substance reinforced by a helical spring wire 92 in a manner well understood. The discharge conduit further comprises a fitting or adapter 94 having a rectangular portion 96 adapted to closely fit the discharge duct 34 of the air impeller. A locking pin 98 operated by a spring biased lever 100 is carried by the adapter 94 and can be accommodated in a suitable opening in the duct 34 so that, in conjunction with an oppositely disposed pin 102 the adapter can be readily applied to the duct and secured in position thereon.

The adapter 94 is arranged to be fitted to the rectangular flexible tube 90 and secured thereto in any suitable manner. For the purpose of shifting the nozzle portion 106 of the discharge conduit or tube 90 so as to easily and quickly direct fluid passing through it in different directions I provide a flexible line or cord 108 which passes through the conduit and is secured to the adapter fitting 94. By pulling on the cord in different directions the discharge conduit 90 can be bent so as to direct the blast from the impeller to the desired area. A wear plate 110 secured to the nozzle portion 106 prevents abrasion of the conduit 90 as well as abrasion of the cord 108.

Another embodiment of the invention is illustrated in FIG. 10, wherein the spraying liquid is discharged into the exhaust air stream instead of into the air intake of the leaf blower. As shown, a liquid discharge line **76*a* can be brought from the tank 42 to a valve 112, from which a line 76*b* extends to a top opening 113 in the discharge conduit 90. The stem of the valve 112 has a universal coupling 114 to which there is attached an operating rod 115 connected to the machine handle 20 and terminating in a cross-piece 116. By such construction the discharge air stream is fed the spraying liquid, whereas with the construction of FIGS. 1–9 the intake air stream is fed the spraying liquid. Control of the liquid flow is had by turning the cross-piece 116 on the rod 115. This embodiment has the advantages mentioned above in connection with the form of the invention shown in FIGS. 1–9.**

It will now be understood from the foregoing that I have provided an improved and effective garden insecticide spray attachment for use with high-powered leaf blowers, by which large areas of foliage can be sprayed with an extremely fine mist that is especially devoid of large droplets. The insecticide liquid from the tank 42, as it is allowed to flow through the discharge line 76 into the air intake 36 of the impeller, is struck with great force by the impeller rotor, and the liquid is thereby broken up into extremely fine droplets. These droplets mix with the incoming air which flows rapidly at high volume, to the end that the discharge blast from the duct 34 is constituted of a fine mist or aerosol mixture of air and insecticide. Such blast covers a very large area and carries for a considerable distance. In consequence, by virtue of my improved attachment as above described, very large areas of foliage can be quickly and effectively sprayed, with no dropping or falling of water droplets to the ground. Instead, all of the insecticide is effectively used on the branches and foliage of the trees and bushes, and virtually none is deposited in the surrounding soil. Therefore there is had a considerable saving of insecticide chemicals which are especially expensive, while at the same time the ecology is greatly benefited due to the withholding of the insecticide substance from the surrounding soil where it would be otherwise washed down into streams, brooks and the like.

The attachment is seen to be especially simple, comprising few parts which can be quickly and economically fabricated and attached to existing leaf blowers. The attachment requires no skill or special tools, and the operation of the sprayer consists merely in filling the tank 44 with the insecticide solution, and operating the leaf blower engine while at the same time adjusting the valve comprising the plug 68 and handle 82 so as to obtain the desired flow of insecticide into the air stream. Suitable manipulation of the cord 108 as the insecticide is fed to the impeller will direct the insecticidal blast in the desired directions. The operator is spared from large falling drops of insecticide liquid, and virtually all of the chemical is discharged at a high rate of velocity as a fine aerosol mist which tenaciously adheres to foliage, branches, tree trunks and the like, all with especially little effort and in a short period of time.

Variations and modifications are possible without departing from the spirit of the invention.

I claim:

1. A garden insecticide spray attachment for use with a leaf blower of the type having structural parts including a fixed centrifugal air impeller casing provided with a fixed tangential discharge duct and a side air intake opening, comprising in combination:
   a. an attachable tank having a bottom wall and side walls, and means for releasably attaching the tank to said structural parts of the leaf blower,
   b. a discharge line for liquid, secured to the bottom wall of the tank to conduct spraying liquid therefrom by gravity flow, said line having a discharge end adapted to extend into the air-stream of the air impeller,
   c. manually operable valve means for controlling the gravity flow of liquid through said discharge line,
   d. an attachable discharge conduit having a nozzle portion movable with respect to the remainder, to direct fluid passing through it in different directions,
   e. means for releasably securing the discharge conduit to the fixed discharge duct of the leaf blower, and
   f. manually operable means for shifting the movable nozzle portion of the discharge conduit,
   g. said discharge conduit and discharge line constituting cooperable parts attachable as a cooperable assemblage to the leaf blower, and said conduit having means enabling the discharge end of the liquid discharge line to extend into it so as to discharge liquid under the action of gravity into the air stream passing through the conduit.

2. A spray attachment as in claim 1, wherein:
   a. the tank has a generally rectangular configuration one lower corner of which has a walled curvilinear recess to accommodate the casing of the air impeller.

3. A spray attachment as in claim 1, wherein:
   a. the manually operable valve means comprises a valve stem disposed in the tank, a valve carried by the stem, and a seat cooperable with the valve and carried on the bottom wall of the tank.

4. A spray attachment as in claim 3, and further including:
   a. a manually operable control device carried by the tank, for holding said valve means in open position thereby to obtain a given rate of flow through the discharge line.

5. A spray attachment as in claim 1, wherein:
   a. the discharge conduit comprises a rectangular adapter member for attachment to the blower discharge duct, and a bendable portion including a wire reinforcement connected to and extending from the adapter member.

6. A garden insecticide spray attachment for use with a leaf blower of the type having structural parts including a centrifugal air impeller provided with a tangential discharge duct and a side air intake opening, comprising in combination:
   a. a tank having a bottom wall and side walls, and means for releasably attaching the tank to said structural parts of the leaf blower, said tank having a generally rectangular configuration one lower corner of which has a walled curvilinear recess to accommodate the case of the air impeller.
   b. a discharge line for liquid, secured to the bottom wall of the tank to conduct spraying liquid therefrom, said line having a free end adapted to extend into the air-stream of the air impeller,
   c. manually operable valve means for controlling the flow of liquid through said discharge line,
   d. a discharge conduit having a nozzle portion movable with respect to the remainder, to direct fluid passing through it in different directions,
   e. means for releasably securing the discharge conduit to the discharge duct of the leaf blower, and
   f. manually operable means for shifting the movable nozzle portion of the discharge conduit,
   g. the bottom wall of the tank being raised and meeting the wall of the curvilinear recess,
   h. said tank having side walls extending below the raised bottom wall and constituting supporting edges on which the tank can stand when otherwise unsupported.

7. A spray attachment as in claim 6, wherein:
   a. said discharge line comprises a tube extending through one side wall of the tank below said bottom wall,
   b. said tank bottom wall having a discharge opening and a valve seat at said opening,
   c. means securing the said tube to the tank bottom wall around the discharge opening,
   d. said manually operable valve means including a valve in the tank, cooperable with said seat.

8. A garden insecticide spray attachment for use with a leaf blower of the type having structural parts including a centrifugal air impeller provided with a tangential discharge duct and a side air intake opening, comprising in combination:
   a. a tank having a bottom wall and side walls, and means for releasably attaching the tank to said structural parts of the leaf blower,
   b. a discharge line for liquid, secured to the bottom wall of the tank to conduct spraying liquid therefrom, said line having a free end adapted to extend into the air-stream of the air impeller,
   c. manually operable valve means for controlling the flow of liquid through said discharge line,
   d. a discharge conduit having a nozzle portion movable with respect to the remainder, to direct fluid passing through it in different directions,
   e. means for releasably securing the discharge conduit to the discharge duct of the leaf blower, and
   f. manually operable means for shifting the movable nozzle portion of the discharge conduit,
   g. said manually operable valve means comprising a valve stem disposed in the tank, a valve carried by the stem, and a stem cooperable with the valve and carried on the bottom wall of the tank,
   h. an adjustment device carried by the tank, for holding said valve means in different adjusted positions thereby to obtain different rates of flow through the discharge line,
   i. the adjustment device comprising a collar mounted on the tank and surrounding the valve stem,
   j. said collar having a stepped edge at one end, k. said valve stem having a laterally projecting shoulder engageable with said stepped edge to effect different axial positions of the stem.

9. A spray attachment as in claim 8, wherein:
a. the valve stem has a handle and is turnable to locate the shoulder thereof in different positions along the stepped edge of the collar.

10. A garden insecticide spray attachment for use with a leaf blower of the type having structural parts including a centrifugal air impeller provided with a tangential discharge duct and a side air intake opening, comprising in combination:
a. a tank having a bottom wall and side walls, and means for releasably attaching the tank to said structural parts of the leaf blower,
b. a discharge line for liquid, secured to the bottom wall of the tank to conduct spraying liquid therefrom, said line having a free end adapted to extend into the air-stream of the air impeller,
c. manually operable valve means for controlling the flow of liquid through said discharge line,
d. a discharge conduit having a nozzle portion movable with respect to the remainder, to direct fluid passing through it in different directions,
e. means for releasably securing the discharge conduit to the discharge duct of the leaf blower, and
f. manually operable means for shifting the movable nozzle portion of the discharge conduit,
g. the discharge conduit comprising a rectangular adapter member for attachment to the blower discharge duct, and a bendable portion including a wire reinforcement connected to and extending from the adapter member,
h. the means for shifting the nozzle portion of the discharge conduit comprising a flexible line having one end secured to the conduit at the adapter member, said line passing through the conduit and, as it is pulled in different directions, flexing the bendable portion to direct the discharge of insecticide spray to desired areas.

* * * * *